US009906998B2

(12) United States Patent
Aminzadeh Gohari et al.

(10) Patent No.: US 9,906,998 B2
(45) Date of Patent: Feb. 27, 2018

(54) MECHANISM TO IMPROVE DYNAMIC SHARING OF RECEIVE CHAIN(S) AMONG RADIO ACCESS TECHNOLOGIES

(71) Applicant: QUALCOMM Incorporated, San Diego, CA (US)

(72) Inventors: Amir Aminzadeh Gohari, San Diego, CA (US); Amit Mahajan, San Deigo, CA (US); Navid Ehsan, San Diego, CA (US); Thomas Klingenbrunn, San Diego, CA (US); Aziz Gholmieh, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 853 days.

(21) Appl. No.: 13/889,091

(22) Filed: May 7, 2013

(65) Prior Publication Data

US 2013/0303168 A1    Nov. 14, 2013

Related U.S. Application Data

(60) Provisional application No. 61/644,127, filed on May 8, 2012.

(51) Int. Cl.
*H04W 36/00* (2009.01)
*H04W 72/12* (2009.01)
(Continued)

(52) U.S. Cl.
CPC ... *H04W 36/0083* (2013.01); *H04W 36/0088* (2013.01); *H04W 72/1215* (2013.01); *H04W 76/026* (2013.01); *H04W 88/06* (2013.01)

(58) Field of Classification Search
None
See application file for complete search history.

(56) References Cited

U.S. PATENT DOCUMENTS 8,134,977 B2    3/2012 Parekh et al.
2006/0176870 A1  8/2006 Joshi et al.
(Continued)

FOREIGN PATENT DOCUMENTS

| CN | 102271360 A | 12/2011 |
|---|---|---|
| EP | 2538715 A1 | 12/2012 |
| WO | 07051184 | 5/2007 |
| WO | 2011075735 | 6/2011 |
| WO | 2011150695 A1 | 12/2011 |

OTHER PUBLICATIONS

Fujitsu: "Way Forward on CSI reporting for CA", 3GPP Draft; R1-111940, 3rd Generation Partnership Project (3GPP) Mobile Competence Centre; 650, Route Des Lucioles; F-06921 Sophia-Antipolis Cedex; France. vol. Ran WG1, No. Barcelona. Spain; 20110509, May 16, 2011 (May 16, 2011), XP050491568.
(Continued)

*Primary Examiner* — Charles Appiah
*Assistant Examiner* — Alexander Yi
(74) *Attorney, Agent, or Firm* — Patterson & Sheridan, LLP

(57) ABSTRACT

Aspects of the present disclosure generally relate to wireless communication and to mechanisms designed to help improve dynamic sharing of one or more receive chains among different radio access technologies (RATs). For example, the mechanisms may be used with LTE and other RATs where Carrier Aggregation is used for simultaneous voice and LTE (SV-LTE) applications.

32 Claims, 12 Drawing Sheets

(51) Int. Cl.
*H04W 76/02* (2009.01)
*H04W 88/06* (2009.01)

(56) References Cited

U.S. PATENT DOCUMENTS

| | | | |
|---|---|---|---|
| 2007/0097931 A1* | 5/2007 | Parekh et al. | 370/338 |
| 2009/0239525 A1 | 9/2009 | Cai et al. | |
| 2011/0269453 A1* | 11/2011 | Ranta-Aho | H04L 5/001 455/424 |
| 2011/0317635 A1 | 12/2011 | Swaminathan | |
| 2012/0282975 A1 | 11/2012 | Mujtaba et al. | |
| 2013/0003577 A1 | 1/2013 | Gupta et al. | |
| 2013/0010763 A1* | 1/2013 | Chen et al. | 370/331 |
| 2013/0045704 A1 | 2/2013 | Kaukovuori et al. | |
| 2013/0077513 A1* | 3/2013 | Ng | H04B 7/024 370/252 |

OTHER PUBLICATIONS

International Search Report and Written Opinion—PCT/US2013/040037—ISA/EPO—Sep. 23, 2013.
"LTE; Evolved Universal Terrestrial Radio Access (E-UTRA); Medium Access Control (MAC) protocol specification (3GPP TS 36.321 version 9.6.0 Release 9)", Technical Specification, European Telecommunications Standards Institute (ETSI), 650, Route Des Lucioles; F-06921 Sophia-Antipolis; France, vol. 3GPP Ran 2, No. V9.6.0, Mar. 1, 2012 (Mar. 1, 2012), XP014070088.
Qualcomm Incorporated: "Dynamic Activation and Deactivation of Secondary Cells During Carrier", 3GPP Draft; R2-120306 Dynamic Deactivation of Secondary Cells, 3GPP, vol. RAN WG2, No. Dresden, Germany; Feb. 10, 2012, Jan. 30, 2012, pp. 1-4, XP050565137, [retrieved on Jan. 30, 2012].

* cited by examiner

MECHANISM TO IMPROVE DYNAMIC SHARING OF RECEIVE CHAIN(S) AMONG RADIO ACCESS TECHNOLOGIES

CROSS-REFERENCE TO RELATED APPLICATIONS

This application claims benefit of priority to U.S. Provisional Application Ser. No. 61/644,127, filed on May 8, 2012, which is expressly incorporated by reference herein in its entirety.

BACKGROUND

Field

Aspects of the present disclosure relate generally to wireless communication systems, and more particularly to mitigating paging collisions when a single radio receiver is camped on two radio access technologies.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communication performed by a user equipment (UE). The method generally includes communicating, via at least first and second receive chains, with a first radio access technology (RAT) using carrier aggregation (CA), tuning away, with the second receive chain, to communicate with a second RAT during a tune-away interval, and manipulating reporting of measurement triggering events used for making decisions regarding CA cells for the first RAT based, at least in part, on a duration of the tune-away interval.

Certain aspects of the present disclosure provide a method for wireless communication performed by a base station. The method generally includes communicating with a user equipment (UE) using carrier aggregation (CA), making handover decisions regarding the UE based on a first set of one or more measurement triggering events, and making decisions regarding CA cells based on a second set of one or more measurement triggering events.

Certain aspects of the present disclosure provide an apparatus for wireless communication performed by a user equipment (UE). The apparatus generally includes means for communicating, via at least first and second receive chains, with a first radio access technology (RAT) using carrier aggregation (CA), means for tuning away, with the second receive chain, to communicate with a second RAT during a tune-away interval, and means for manipulating reporting of measurement triggering events used for making decisions regarding CA cells for the first RAT based, at least in part, on a duration of the tune-away interval.

Certain aspects of the present disclosure provide an apparatus for wireless communication performed by a base station. The apparatus generally includes means for communicating with a user equipment (UE) using carrier aggregation (CA), means for making handover decisions regarding the UE based on a first set of one or more measurement triggering events, and means for making decisions regarding CA cells based on a second set of one or more measurement triggering events.

Certain aspects of the present disclosure provide an apparatus for wireless communication performed by a user equipment (UE). The apparatus generally includes at least one processor configured to communicate, via at least first and second receive chains, with a first radio access technology (RAT) using carrier aggregation (CA), tune away, with the second receive chain, to communicate with a second RAT during a tune-away interval, and manipulate reporting of measurement triggering events used for making decisions regarding CA cells for the first RAT based, at least in part, on a duration of the tune-away interval; and a memory coupled with the at least one processor.

Certain aspects of the present disclosure provide an apparatus for wireless communication performed by a base station. The apparatus generally includes at least one processor configured to communicate with a user equipment (UE) using carrier aggregation (CA), make handover decisions regarding the UE based on a first set of one or more measurement triggering events, and make decisions regarding CA cells based on a second set of one or more measurement triggering events; and a memory coupled with the at least one processor.

Certain aspects of the present disclosure provide a program product for wireless communication performed by a user equipment (UE) comprising a computer readable medium having instructions stored thereon. The instructions are generally for communicating, via at least first and second receive chains, with a first radio access technology (RAT) using carrier aggregation (CA), tuning away, with the second receive chain, to communicate with a second RAT during a tune-away interval, and manipulating reporting of measurement triggering events used for making decisions regarding CA cells for the first RAT based, at least in part, on a duration of the tune-away interval.

Certain aspects of the present disclosure provide a program product for wireless communication performed by a base station comprising a computer readable medium having instructions stored thereon. The instructions are generally for communicating with a user equipment (UE) using carrier aggregation (CA), making handover decisions regarding the UE based on a first set of one or more measurement triggering events, and making decisions regarding CA cells based on a second set of one or more measurement triggering events.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
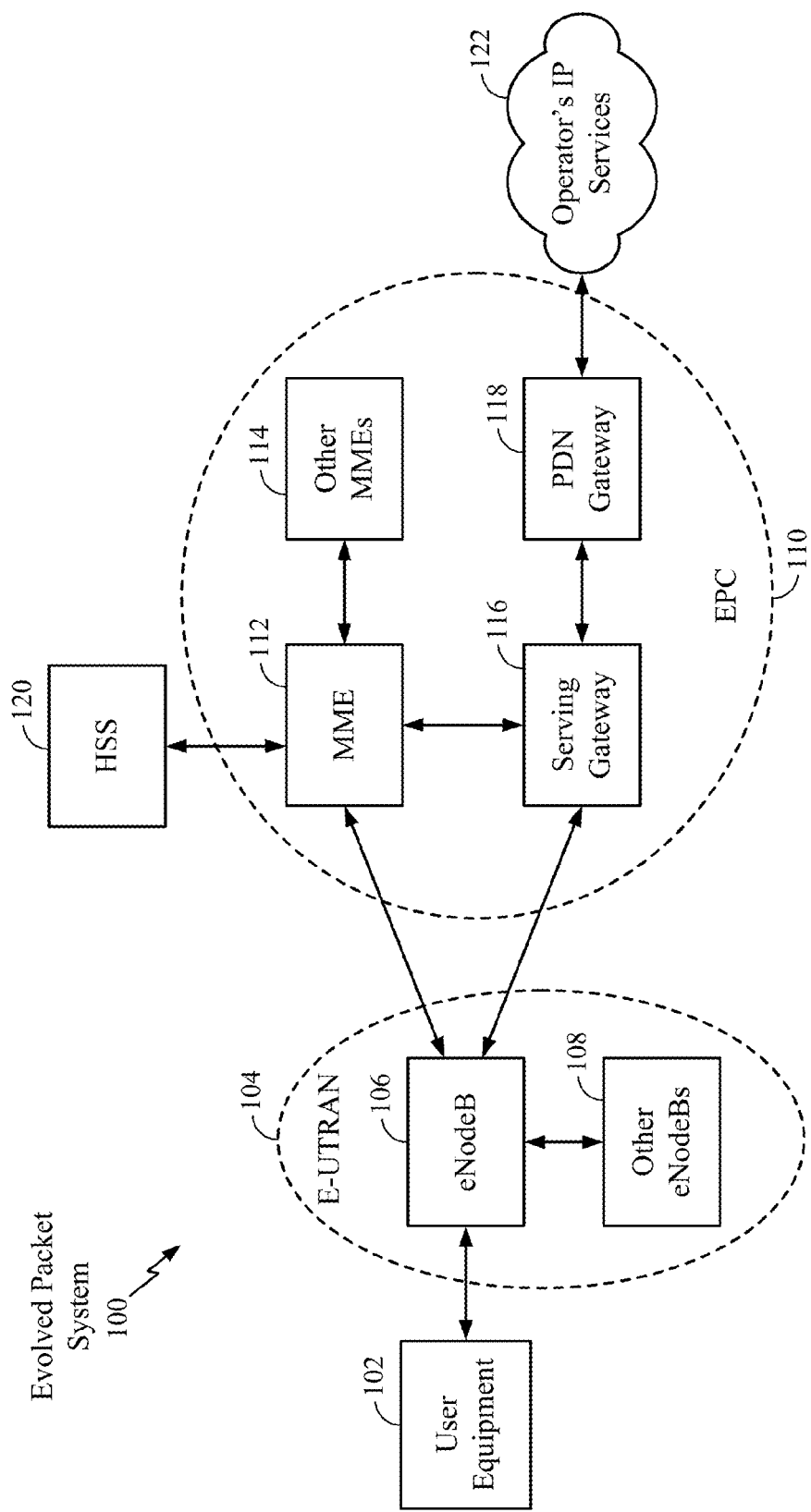
FIG. 1 is a diagram illustrating an example of a network architecture, according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via an X2 interface (e.g., backhaul). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
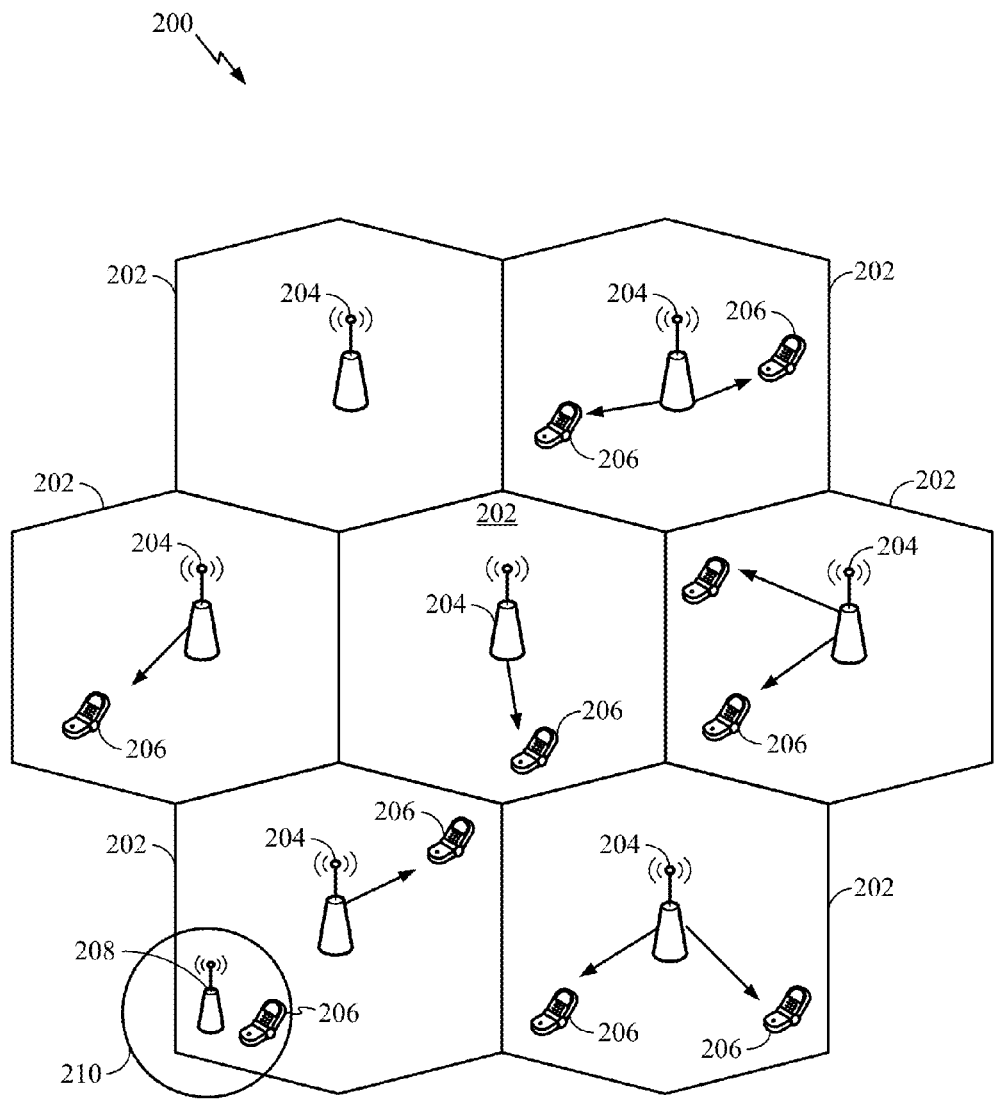
FIG. 2 is a diagram illustrating an example of an access network, according to aspects of the present disclosure.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be referred to as a remote radio head (RRH). The lower power class eNodeB 208 may be a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
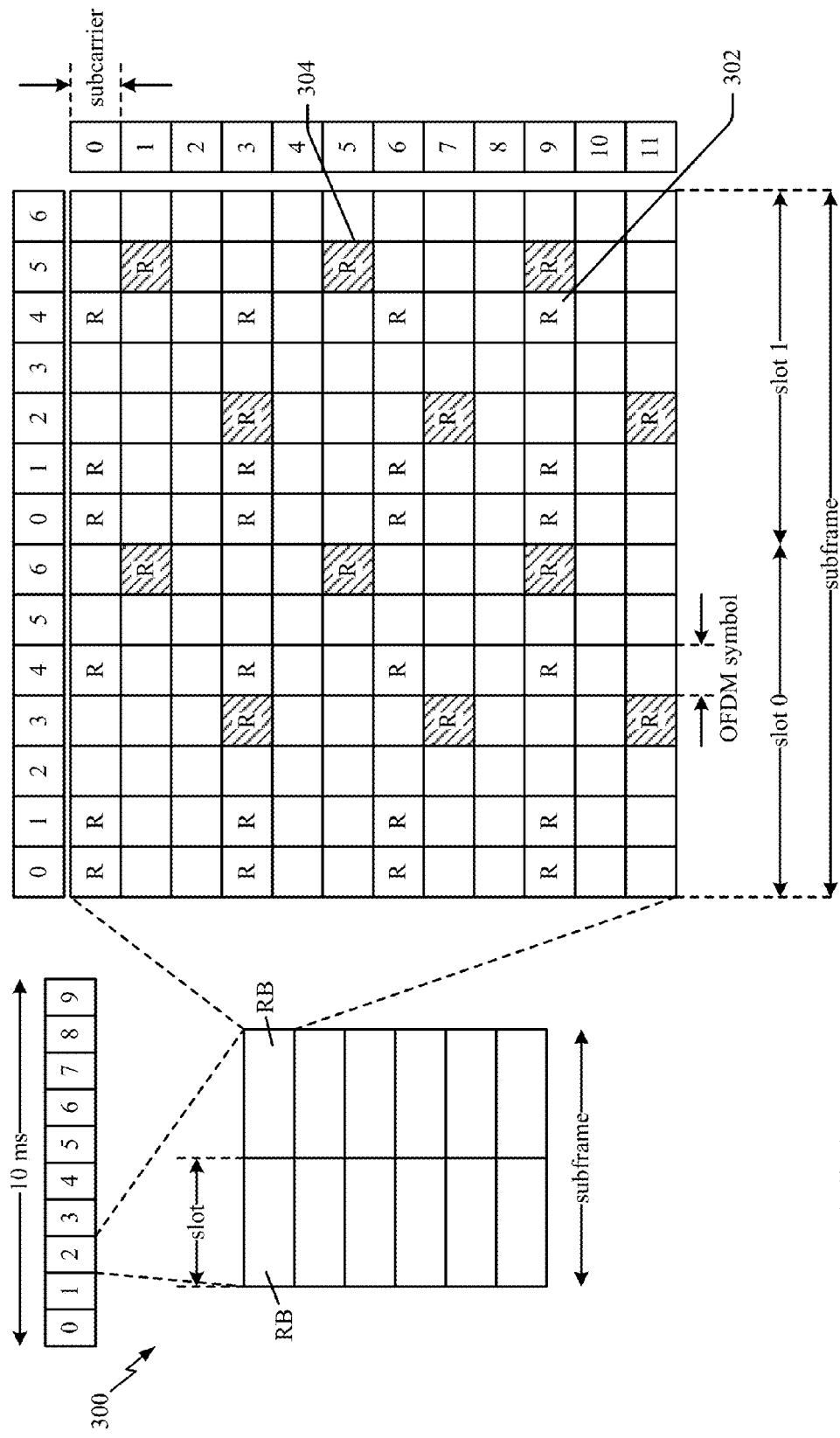
FIG. 3 is a diagram illustrating an example of a downlink frame structure in LTE, according to aspects of the present disclosure.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
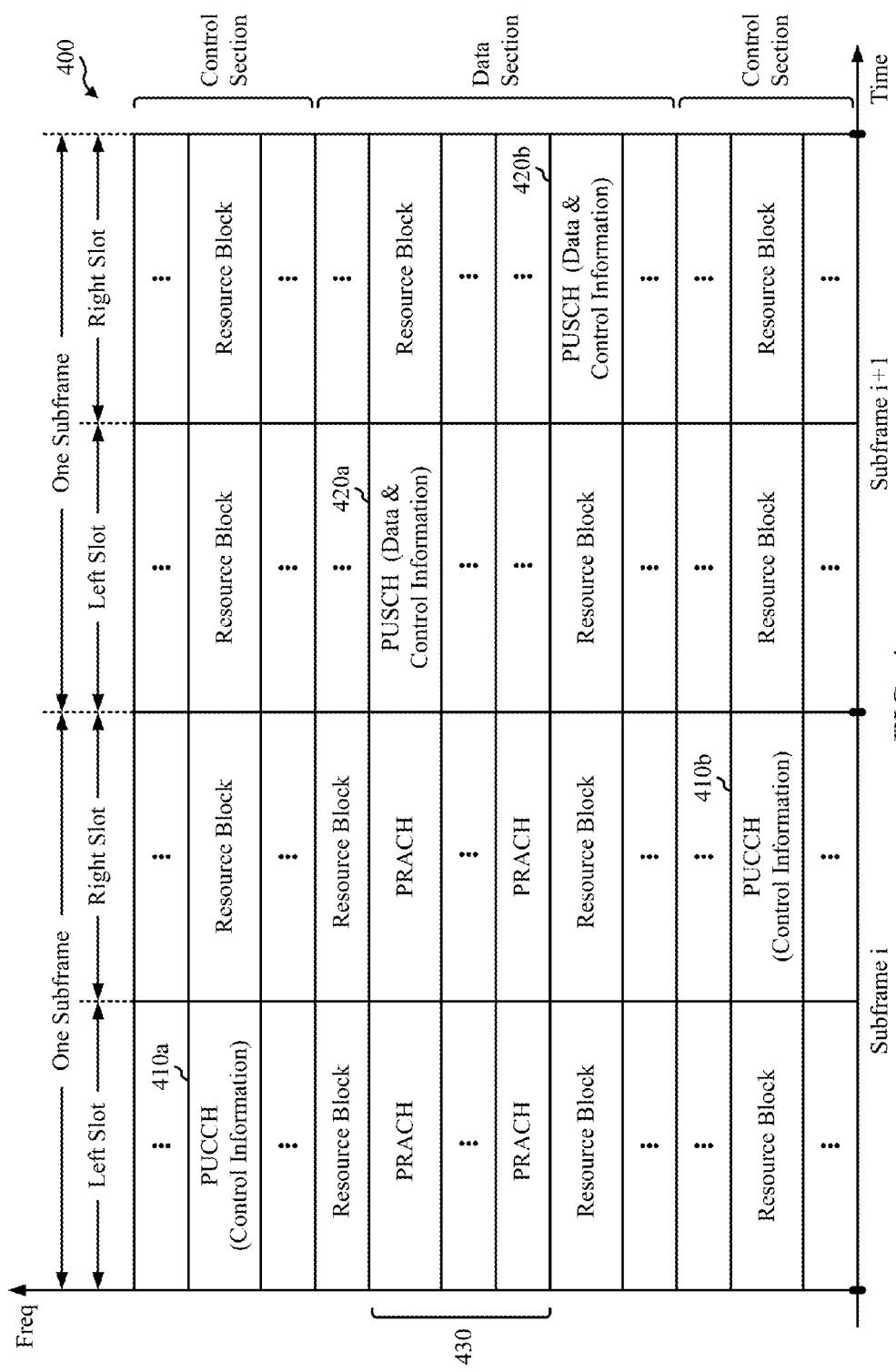
FIG. 4 is a diagram illustrating an example of an uplink frame structure in LTE, according to aspects of the present disclosure.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410*a*, 410*b* in the control section to transmit control information to an eNodeB. The UE may also be assigned resource blocks 420*a*, 420*b* in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
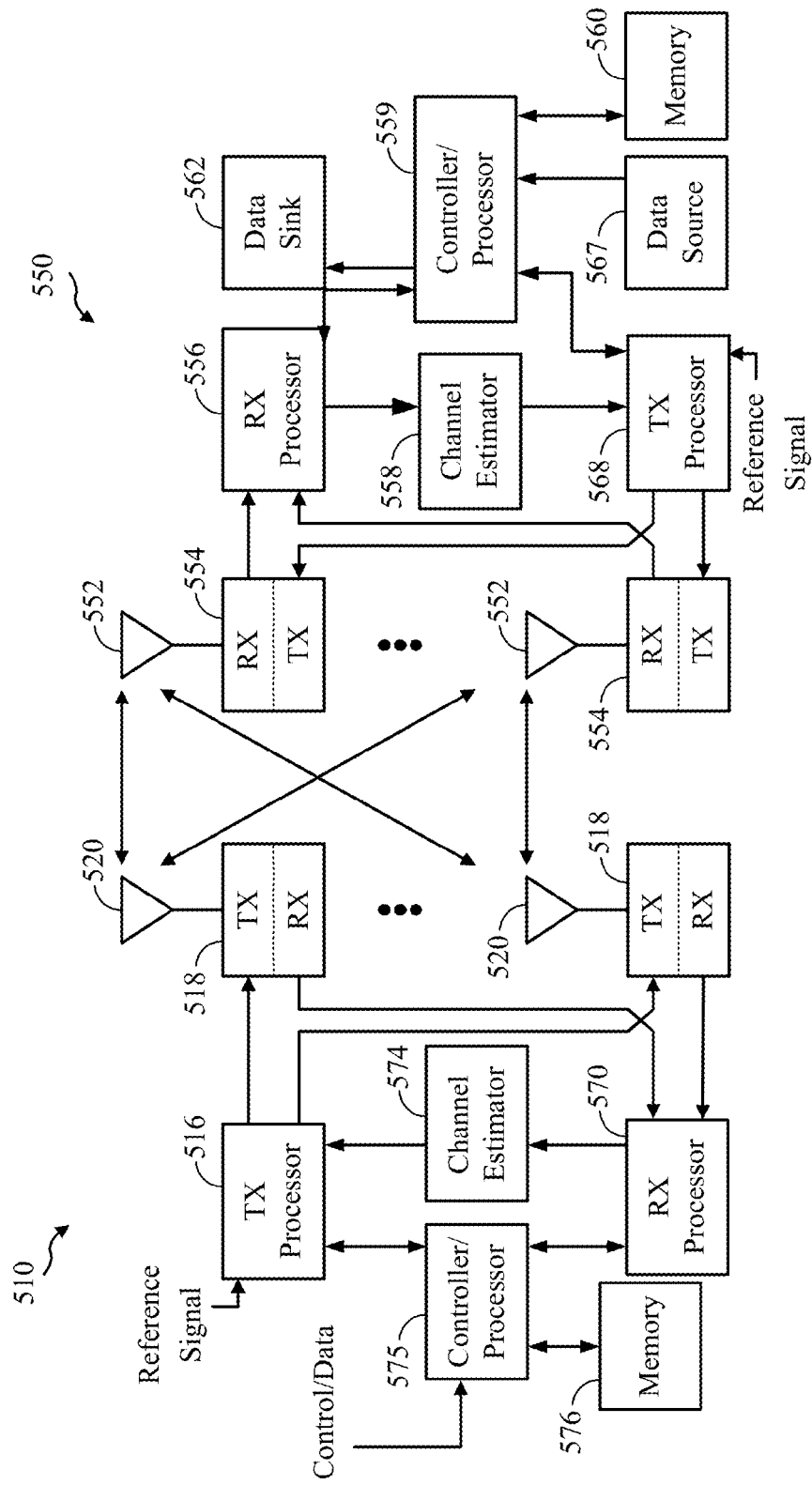
FIG. 5 is a diagram illustrating an example of an evolved Node B and user equipment in an access network, according to aspects of the present disclosure.

FIG. 5 is a block diagram of an eNodeB 510 in communication with a UE 550 in an access network. In the downlink, upper layer packets from the core network are provided to a controller/processor 575. The controller/processor 575 implements the functionality of the L2 layer. In the downlink, the controller/processor 575 provides header compression, ciphering, packet segmentation and reordering, multiplexing between logical and transport channels, and radio resource allocations to the UE 550 based on various priority metrics. The controller/processor 575 is also responsible for HARQ operations, retransmission of lost packets, and signaling to the UE 550.

The TX processor 516 implements various signal processing functions for the L1 layer (i.e., physical layer). The signal processing functions includes coding and interleaving to facilitate forward error correction (FEC) at the UE 550 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 574 may be used to determine the coding and modulation scheme, as well as for spatial processing. The channel estimate may be derived from a reference signal and/or channel condition feedback transmitted by the UE 550. Each spatial stream is then provided to a different antenna 520 via a separate transmitter 518TX. Each transmitter 518TX modulates an RF carrier with a respective spatial stream for transmission.

At the UE 550, each receiver 554RX receives a signal through its respective antenna 552. Each receiver 554RX recovers information modulated onto an RF carrier and provides the information to the receiver (RX) processor 556. The RX processor 556 implements various signal processing functions of the L1 layer. The RX processor 556 performs spatial processing on the information to recover any spatial streams destined for the UE 550. If multiple spatial streams are destined for the UE 550, they may be combined by the RX processor 556 into a single OFDM symbol stream. The RX processor 556 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 510. These soft decisions may be based on channel estimates computed by the channel estimator 558. The soft decisions are then decoded and deinterleaved to recover the data and control signals that were originally transmitted by the eNodeB 510 on the physical channel. The data and control signals are then provided to the controller/processor 559.

The controller/processor 559 implements the L2 layer. The controller/processor can be associated with a memory 560 that stores program codes and data. The memory 560 may be referred to as a computer-readable medium. In the uplink, the control/processor 559 provides demultiplexing between transport and logical channels, packet reassembly, deciphering, header decompression, control signal processing to recover upper layer packets from the core network. The upper layer packets are then provided to a data sink 562, which represents all the protocol layers above the L2 layer. Various control signals may also be provided to the data sink 562 for L3 processing. The controller/processor 559 is also responsible for error detection using an acknowledgement (ACK) and/or negative acknowledgement (NACK) protocol to support HARQ operations.

In the uplink, a data source 567 is used to provide upper layer packets to the controller/processor 559. The data source 567 represents all protocol layers above the L2 layer. Similar to the functionality described in connection with the downlink transmission by the eNodeB 510, the controller/processor 559 implements the L2 layer for the user plane and the control plane by providing header compression, ciphering, packet segmentation and reordering, and multiplexing between logical and transport channels based on radio resource allocations by the eNodeB 510. The controller/processor 559 is also responsible for HARQ operations, retransmission of lost packets, and signaling to the eNodeB 510.

Channel estimates derived by a channel estimator 558 from a reference signal or feedback transmitted by the eNodeB 510 may be used by the TX processor 568 to select the appropriate coding and modulation schemes, and to facilitate spatial processing. The spatial streams generated by the TX processor 568 are provided to different antenna 552 via separate transmitters 554TX. Each transmitter 554TX modulates an RF carrier with a respective spatial stream for transmission.

The uplink transmission is processed at the eNodeB 510 in a manner similar to that described in connection with the receiver function at the UE 550. Each receiver 518RX receives a signal through its respective antenna 520. Each receiver 518RX recovers information modulated onto an RF carrier and provides the information to a RX processor 570. The RX processor 570 may implement the L1 layer.

The controller/processor 575 implements the L2 layer. The controller/processor 575 can be associated with a memory 576 that stores program codes and data. The memory 576 may be referred to as a computer-readable medium. In the uplink, the control/processor 575 provides demultiplexing between transport and logical channels, packet reassembly, deciphering, header decompression, control signal processing to recover upper layer packets from the UE 550. Upper layer packets from the controller/processor 575 may be provided to the core network. The controller/processor 575 is also responsible for error detection using an ACK and/or NACK protocol to support HARQ operations.

Carrier Aggregation

Figure 6:
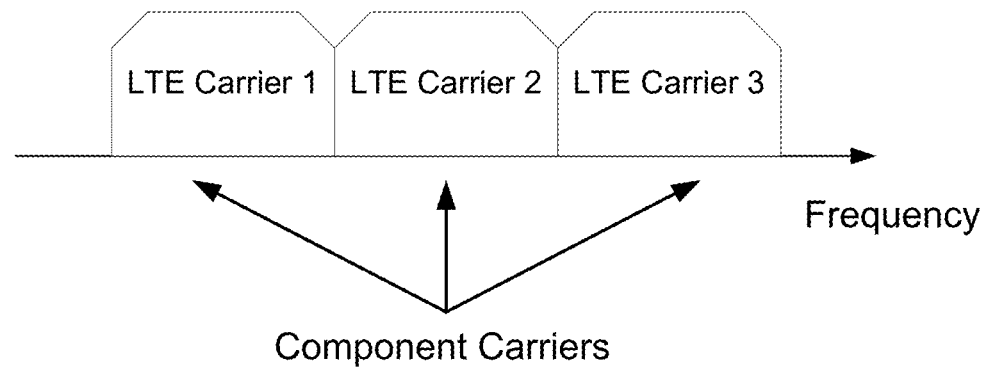
FIG. 6 illustrates continuous carrier aggregation, in accordance with certain aspects of the disclosure.

LTE-Advanced UEs may use spectrum of up to 20 MHz bandwidths allocated in a carrier aggregation of up to a total of 100 MHz (5 component carriers) for transmission in each direction. For the LTE-Advanced mobile systems, two types of carrier aggregation (CA) methods have been proposed, continuous CA and non-continuous CA. They are illustrated in FIGS. 6 and 7.

Figure 7:
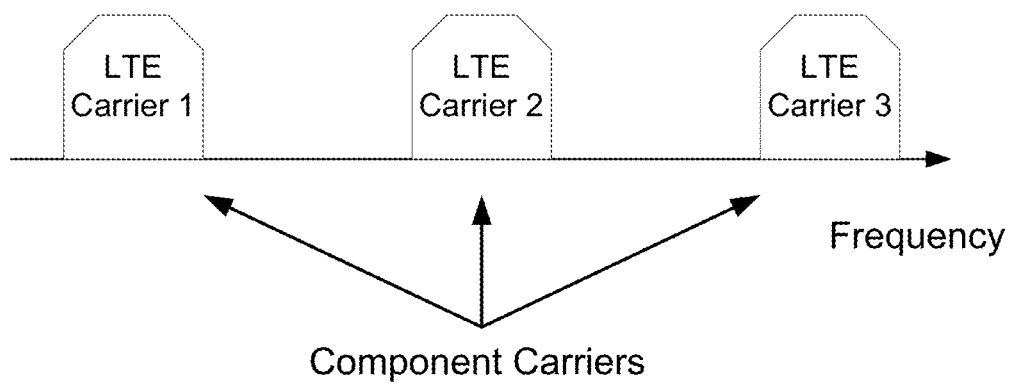
FIG. 7 illustrates non-continuous carrier aggregation, according to aspects of the present disclosure.

Non-continuous CA occurs when multiple available component carriers are separated along the frequency band (FIG. 7). On the other hand, continuous CA occurs when multiple available component carriers are adjacent to each other (FIG. 6). Both non-continuous and continuous CA aggregate multiple LTE/component carriers to serve a single unit of LTE Advanced UE.

According to various embodiments, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH).

Figure 8:
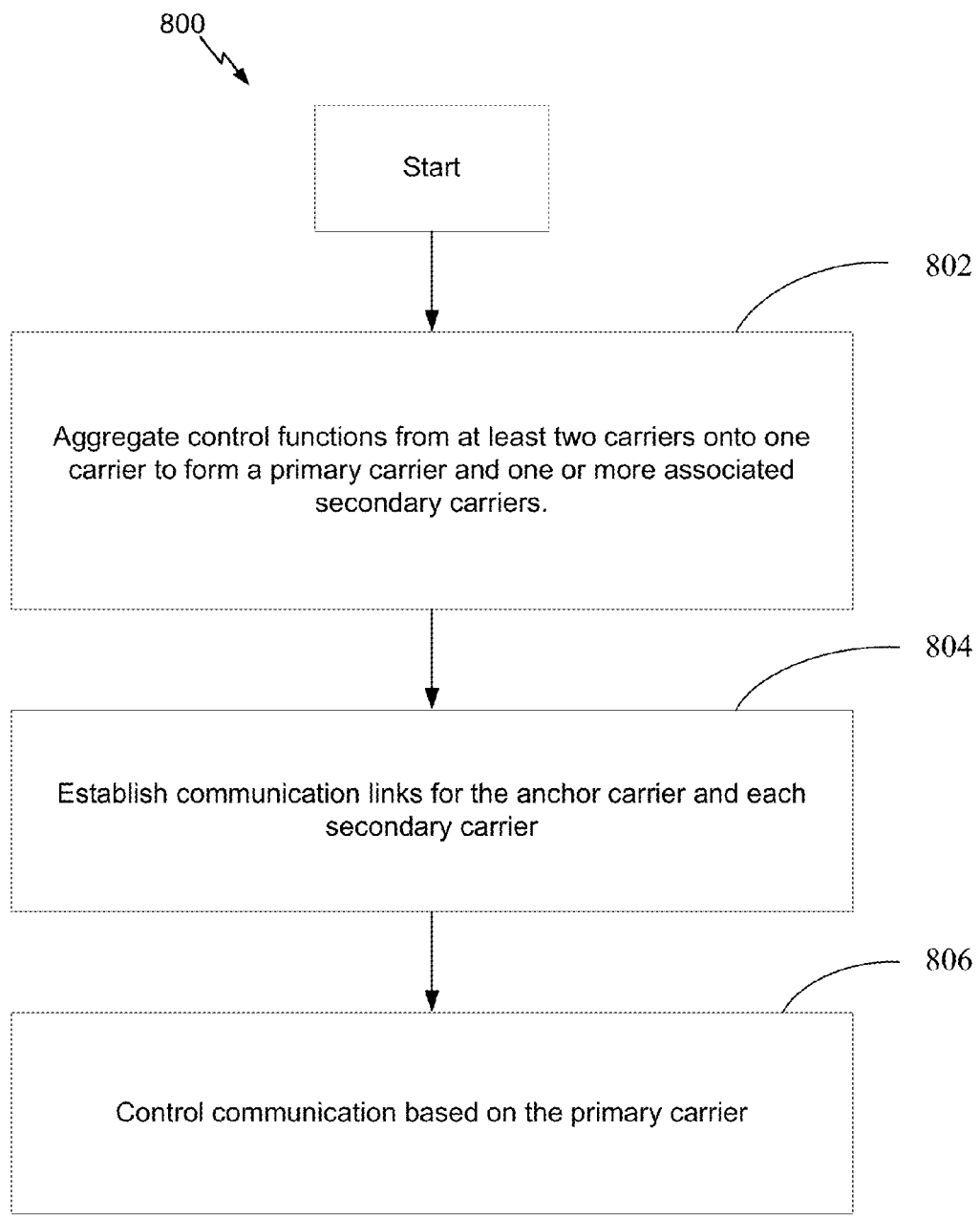
FIG. 8 illustrates example operations, in accordance with certain aspects of the disclosure.

FIG. 8 illustrates example operations 800 for controlling radio links in a multiple carrier wireless communication system by grouping physical channels according to one example. As shown, the method includes, at block 802, aggregating control functions from at least two carriers onto one carrier to form a primary carrier and one or more associated secondary carriers. Next at block, 804, communication links are established for the primary carrier and each secondary carrier. Then, communication is controlled based on the primary carrier in block 806.

Mechanism to Improve Dynamic Sharing of Receive Chain(S) Among Radio Access Technologies Aspects of the present disclosure provide mechanisms designed to help improve dynamic sharing of one or more receive chains among different radio access technologies (RATs). For example, the mechanisms presented herein may be used with LTE and other RATs where Carrier Aggregation is used for simultaneous voice and LTE (SV-LTE) applications.

As noted above, a mobile communication device, such as a wireless device 550, may be able to support Carrier aggregation (CA). In some cases, such devices may have one or more RF chips, receive chains (Rx chains), or transmit chains (Tx chains) that are shared between multiple radio access technologies (RATs), such as LTE and other technologies.

One example application of such transmit/receive path sharing would be to support simultaneous voice and LTE (SV-LTE) in addition to carrier aggregation (CA). Assuming that there are two RF paths (either Rx or TX chains or a combination of both) available, it may be desired to dynamically time-share (TDD) a secondary RF chain between two RATs (for example, LTE and 1×RTT), in order to provide various desirable capabilities. Such capabilities may include supporting another RAT's (e.g., lx) page monitoring while in LTE RRC connected mode and supporting mobile originated (MO) and mobile terminated (MT) calls on the other RAT (e.g., 1× voice calls) while in LTE RRC connected mode.

To provide these capabilities, a UE may need to tuneaway (TA) the secondary RF chain from one RAT (e.g., LTE) for particular time, referred to herein as a TA interval. The duration and periodicity of TA intervals may depend on a variety of factors. For example, for periodic paging (e.g., 1.28, 2.56, or 5.12 s), relatively short TA intervals (e.g., less than 100-200 ms) may be used. For secondary RAT (e.g., 1×) measurements, area updates, and aperiodic tune-aways, relatively longer TA intervals (e.g., duration<300-500 ms) may be used, while actual voice or data calls on the secondary RAT may be unpredictable and have the longest TA intervals (e.g., durations on the order of minutes).

Various approaches may be employed for the support of such behavior. For example, according to a first approach (standards-based), a UE may signal an eNB a deactivation or release request of the secondary chain. This approach may be suitable for the longer TAs (e.g., not page monitoring) due to deactivation/reactivation or release/re-addition latency (of secondary cells, i.e., SCells) and signaling overhead or complexity.

According to a second approach (CQI-based), a UE may send an artificially low value for a channel quality indicator CQI (e.g., CQI=0) for a SCell during tune-aways. This essentially makes an eNB stop scheduling the UE on the SCell and may provide for fast recovery after completion of the tune away (e.g., by providing a "real" CQI). In addition, this may possibly interfere with an eNB scheduler and CQI outer loop algorithms. Further, this approach may not be efficient for longer TAs, as the eNB may add/remove/activate/deactivate the SCell, not knowing the actual cause of low value reported for CQI. Finally, the faked CQI value may not be distinguishable with actual fades/out of coverage instances for eNB.

According to certain aspects of the present disclosure, reporting of certain measurement triggering events may be manipulated in order to mitigate the impact of unwanted changes in SCell mobility (e.g., reactivation/addition) by manipulating the reporting of measurement events. For example, not reporting some measurement events may prevent eNB from reactivation of the current SCell or addition of a new SCell, which may reduce latency when exiting a tune-away. This approach may be suited for relatively long TAs because measurement reporting is an RRC layer signaling. Actions that require RRC layer involvement typically come with a minimum of tens to hundreds of milliseconds of delay.

Aspects of the present disclosure provide enhancements to techniques involving the manipulation of reporting before, during and/or after tune-away intervals. As will be described in greater detail below, in some cases, a UE may perform some manipulations of reporting measurement triggering events autonomously. In some cases, network-enhancements may be utilized, for example, where a base station (eNB) may configure a UE with parameters that provide desired performance. Further, in some cases, the network may utilize a first set of measurement triggering events to make decisions regarding handover and a second set of measurement triggering events to make decisions regarding SCell mobility (e.g., deactivation, reactivation, deletion, and/or addition).

The techniques presented herein may help maintain a secondary cell (SCell) status during TA intervals to achieve desired results. During TA, if an SCell is active, it may be desirable for a UE to not be scheduled on it. This may be accomplished by reporting a low value for CQI (e.g., CQI=0). In addition, if SCell is active, it may be preferred that it gets deactivated as soon as possible. This may be achieved, for example, by repeated transmission of CQI=0 or by special use/manipulation of measurement reports, as described below.

On the other hand, if SCell is deactivated, it may be desirable that it is not reactivated during TA. This may be achieved by faking measurements reports, as will be described in greater detail below.

In general, it may be desirable to avoid an SCell change followed by the activation of the new SCell. This may also be achieved by faking measurements reports.

After a tune-away, upon resuming normal operation, a fast SCell activation or scheduling on SCell may be desirable. If SCell is active, normal reporting may be used (e.g., no CQI=0 transmission). If SCell is deactivated, fast reactivation of SCell may be achieved by proper measurement reports, as described below.

On the other hand, if SCell is deactivated and is currently out of range, a fast change of SCell may be desirable. This may also be achieved by proper measurement reports, as noted below.

If no SCell is configured and the UE is in the range of an SCell, addition of a new SCell may be desirable (e.g., given that there is enough data for the UE). This may also be facilitated by proper measurements reports.

Measurement reports may be triggered by a number of events. As a result, from a network perspective, the sending of a report may be interpreted as occurrence of that event. Aspects of the present disclosure, in some cases, involve manipulating reporting of measurement triggering events, for example, to mask the occurrence of an event that might lead to undesirable delays on the network-side. In some cases, a measurement report may be sent indicating the occurrence of a triggering event that never actually occurred.

Various events related to measured signal strength in a serving and/or neighbor cells may trigger measurement reporting by a UE in LTE. For example, event A1 which triggers a measurement report when a serving cell (PCell or SCell) becomes greater than a threshold value. Event A2 triggers a measurement report when a serving cell (PCell or SCell) becomes worse than a threshold value. Event A3 triggers a measurement report when a neighbor cell becomes offset better than PCell. This event is typically used for handover decisions by eNB. Event A4 triggers a measurement report when a neighbor cell becomes an offset better than a threshold value.

While not shown, other events may also trigger measurement reporting. As an example, Event A5 triggers measurement reporting when PCell becomes worse than a first threshold (thr1) and neighbor becomes better than a second threshold (thr2). As another example, Event A6 triggers measurement reporting when a neighbor cell on the secondary component carrier becomes better than SCell by an offset amount. This event is an optional event in LTE Rel. 10 and can be used for making decisions regarding SCell change.

Figure 9:
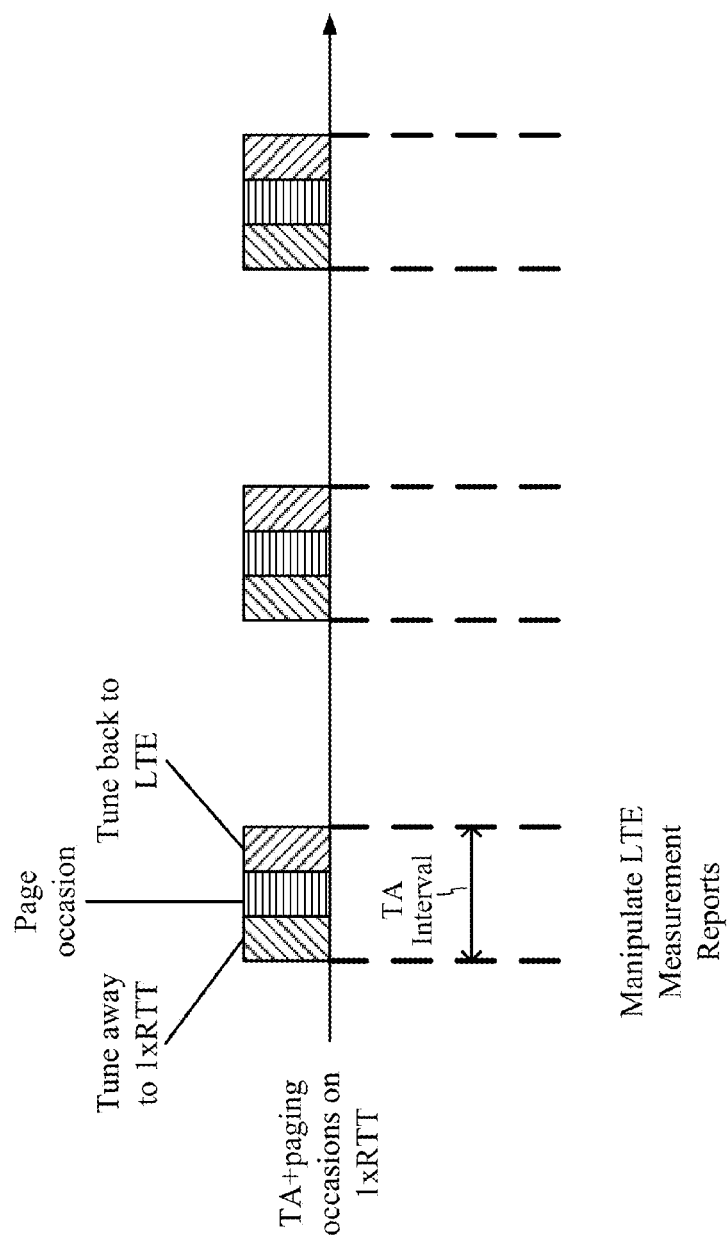
FIG. 9 is a diagram illustrating example tune-away intervals, according to aspects of the present disclosure.

FIG. 9 illustrates how a UE may tune an RF chain (shared between LTE and another RATs, e.g., 1x) away from LTE for a TA interval. In the illustrated example, the TA is performed to monitor for a 1x page occasion. As illustrated, during the TA and, in some cases upon entering and/or exiting the TA, LTE measurement reports may be manipulated to achieve desired network performance.

In some cases, event triggers may have a "report on leave" feature where a measurement is triggered if a condition that triggered a measurement report no longer exists. Aspects of the present disclosure may utilize the report on leave feature to achieve desired results. In some cases, it may also be desirable to mask measurement reports on neighbor cells (with a UE not sending reports) by using the s-measure criteria and an RSRP level of a primary cell (PCell).

As noted above, one technique to manipulate measurement reporting is to use what may be referred to as "rude TAs" and report CQI=0 during TA periods. As noted above, this may be suitable for short TAs, but may come with performance degradation for longer TAs. For example, during a 1x call, the network will consistently receive CQI=0 with good measurement reports, which have undesirable effects. Further, it is possible that the network may not be able to distinguish actual fades/out of SCell range situations with TAs.

Aspects of the present disclosure, however, may provide solutions that address these issues. In some cases, exactly how measurement reports are manipulated may depend, at least in part, on the duration of a TA interval.

Network-Assisted Mechanisms

Measurement events configuration and SCell status decisions are typically made by the network. As a result, with network support in understanding of UE's behavior, there will be performance improvements. Therefore, in some cases, the manipulation of measurement reports (and use thereof to achieve a desired result) may be assisted by network interaction. Furthermore, network assistance may also help avoid the negative impact on handover and/or the rapid addition/removal of SCells (a ping-pong effect) on such decisions that may be caused by faking measurements.

In some cases, network assistance may be achieved if the network side is able to distinguish between events used for handover (HO) and SCell mobility (addition/activation/deletion/deactivation). Furthermore, a network may be able to configure a UE for required measurement reporting events, to achieve reporting manipulations by the UE described below.

In some cases a first set of measurement events may be dedicated for handover decisions, but a second set of measurements for SCell mobility decisions. As an example, the network may use events A3 or A5 for handover decisions, but a combination of events A1, A2, A4, and/or A6 (if supported by UE) for SCell mobility decisions (addition/release/activation/deactivation).

Figure 10:
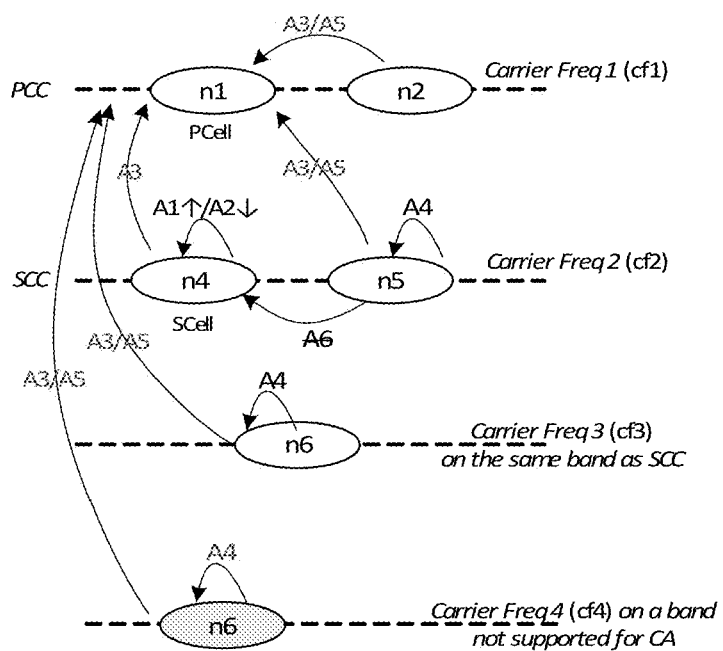
FIG. 10 is a diagram illustrating the use of different sets of event-triggered measurements for different purposes, according to aspects of the present disclosure.

This use of different measurement events for HO and SC mobility decisions is illustrated in FIG. 10. As illustrated, events A3/A5 may be used to make HO decisions (e.g., as shown to handover from a first cell n2 to a neighbor cell n1). Handovers may also be made from neighbors on other carrier frequencies (whether supported for carrier aggregation or not). On the other hand, the network may use event A4 for SCell addition and events A4 or A6 for SCell changes (e.g., removing current SCell and adding another one).

The network may use event A2 for deactivation (or release) of the SCell (this is in addition to other situations that lead to SCell deactivation/removal). On the other hand, the network may use the "report on leave" feature of event A2 (if supported by standard/network) for reactivation/re-addition of the SCell. Alternatively or additionally, event A1 triggered measurement report may be used for activation/reactivation of SCell.

In some cases, when configuring the UE for measurement reporting, the network may set a distinct threshold (very low/high) for A1/A2 events that are used for signaling TAs. As a result, such events may only be triggered by a UE in the case of TA and not during normal operation. In some cases, the network may also configure the UE with periodic measurement reports on the SCell (instead of event triggered reporting).

As previously noted, exactly how measurement reports are manipulated, in some cases, may be based on TA interval duration. For example, since manipulating measurement reports may result in a higher latency than reporting CQI=0, a UE may have the ability to determine whether a TA interval is long enough for adopting the measurement-based solution or whether the CQI-based solution would be preferable.

Generally speaking, short TA intervals (~100-200 ms) may be best handled by reporting CQI=0 without the need for faking measurement reports. If SCell is deactivated after short TA gaps (e.g., due to low CQI reports), a UE can follow the behavior described below upon return from a TA (to normal operation).

For longer TA intervals, a UE may be configured to fake measurement reports when entering and during a longer TA intervals. If configured for periodic measurement reporting, a UE may report the lowest possible value for the periodic measurement reports for the SCell.

Upon entering TA intervals, a UE may send reports, depending on what type of triggered reporting it is configured for. For example, if configured for event triggered reporting for event A2, upon entering the TA interval, the UE may send an event triggered measurement report for event A2 on the SCell with the lowest possible value.

Similarly, during TA intervals, a UE may or may not send reports, depending on its configuration. For example, during the TA interval, even if configured to do so, the UE may not send event triggered reporting for events A1/A2 for the SCell and events A4/A6 for neighbors on a secondary component carrier (SCC). In some cases, even if configured, the UE may not send event triggered reporting for events A4/A6 for neighbors on CA supported frequencies. For example, if a UE is capable of CA on bands B4 and B13 and the PCell in on B13, the UE may not send A4/A6 triggered reports for carrier frequencies that are on B4.

On the other hand, as there may be little or no impact on the secondary RF chain resource sharing, during TA intervals, the UE may send event triggered reporting neighbors on bands that are not supported for CA. Additionally, the UE may send event triggered reporting for events A3 and A5 even for CA capable bands. This may help ensure that possible HOs are not impacted by measurement faking as a result of network's assumptions.

Upon exiting TA intervals, a UE may take certain action designed to enable fast resumption of CA operation. As an example, after a TA interval, if an SCell is configured and deactivated, a UE may immediately transmit a measurement report triggered by event A1 on the SCell with the actual measurement value without waiting for the network configured timers (e.g. Time To Trigger, TTT) to expire. This may signal the normal operation of the SCell to the network.

In general, after retiring from a TA, a UE may stop faking measurement reports and trigger measurements for all of the applicable events (A1/A4/A6) that were masked due to manipulation during the TA. Of course, if the trigger criteria for any of these events are not satisfied after the TA anymore, there is no need to send a report.

According to certain aspects, performance benefits may be achieved even without network assistance. In such cases, a UE may be configured to behave in a similar manner to the case with network assistance. However, to avoid an impact on HO decisions by the network caused by the UE faking measurements, the UE may be configured to stop faking measurement reports in cases where handover may be likely or desired (e.g., if PCell quality is less than a threshold). Without the network awareness, this may lead to rapid SCell activation/deactivation (ping-pong effect) during TA. In some case, however, a UE may mitigate or avoid this by sending CQI=0 and not monitoring SCell.

Figure 11:
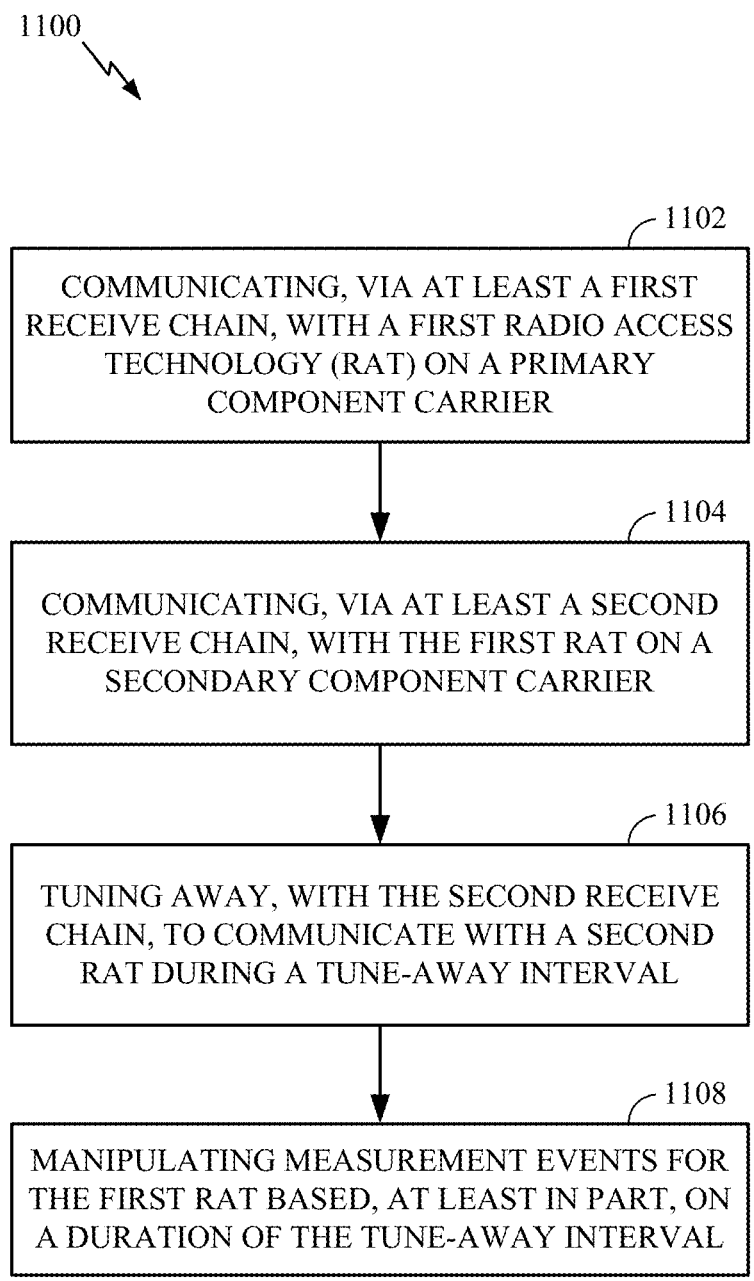
FIG. 11 illustrates example operations performed, for example, by a UE, according to aspects of the present disclosure.

FIG. 11 illustrates example operations 1100 that may be performed by a user equipment (UE), such as UE 550 shown in FIG. 5, in accordance with aspects of the present disclosure. The operations 1200 may be performed, for example, by one or more of Rx processor 556, controller/processor 559, or Tx processor 568.

Operations 1100 begin, at 1102, by communicating, via at least first and second receive chains, with a first radio access technology (RAT) using carrier aggregation (CA). At 1104, the UE tunes away, with the second receive chain, to communicate with a second RAT during a tune-away interval. At 1106, the UE manipulates reporting of measurement triggering events used for making decisions regarding CA cells for the first RAT based, at least in part, on a duration of the tune-away interval.

Figure 12:
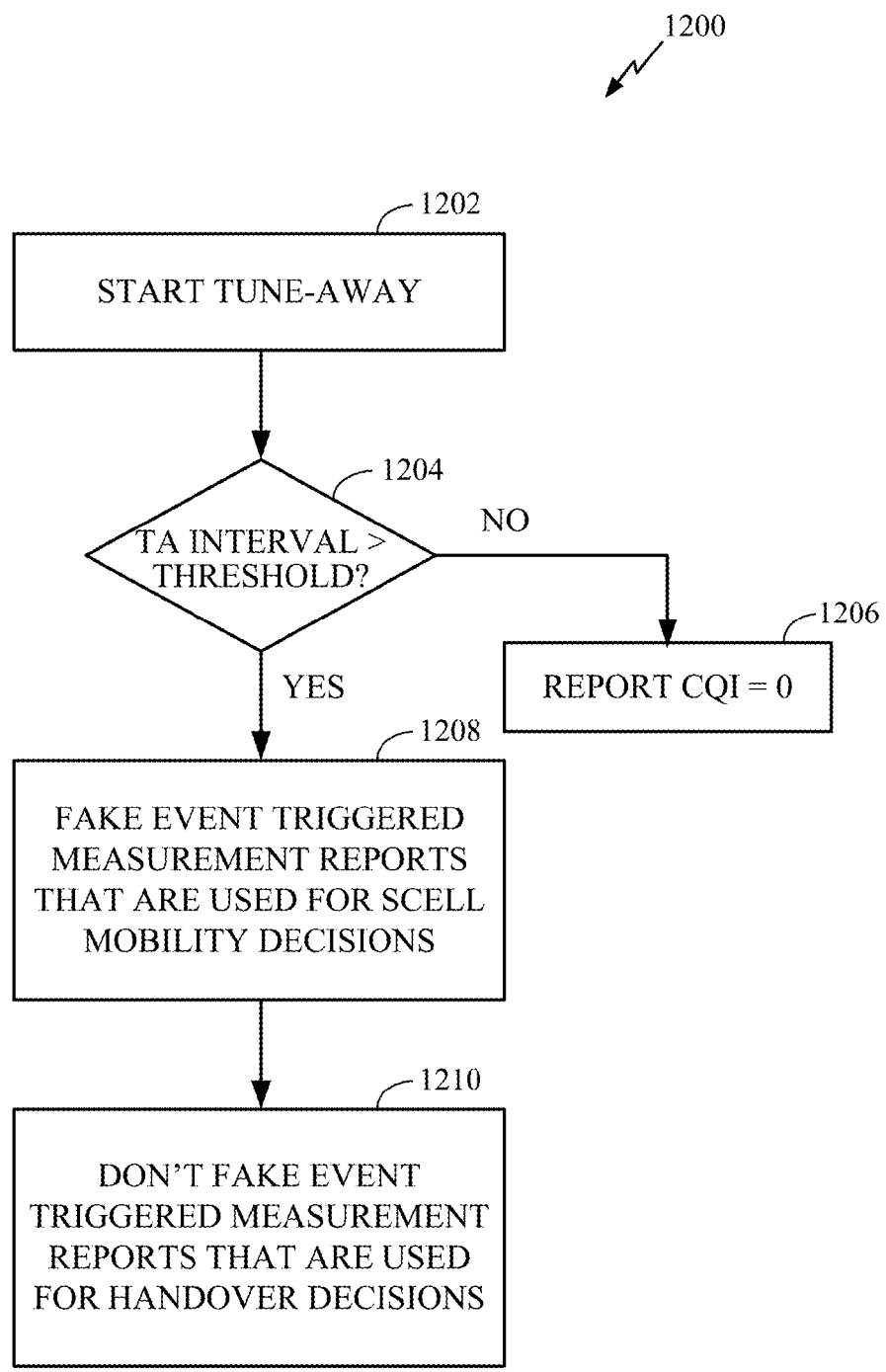
FIG. 12 illustrates example operations for manipulating measurement reporting based on tune-away interval duration, according to aspects of the present disclosure.

As noted above, in some cases, how measurement reports are manipulated may be based, at least in part, on a duration of a TA interval. As illustrated in FIG. 12, when a UE enters a TA interval, at 1202, it may determine if the TA interval is above a threshold value, at 1204. If not, a lowest CQI value (e.g., CQI=0) may be reported, at 1206, regardless of an actual corresponding measurement value.

On the other hand, if the TA interval is not above the threshold value, the UE may fake event triggered measurement reports used for SCell mobility decisions, at 1208. As discussed above, to ensure adequate handover performance, at 1210, the UE does not fake event triggered measurement reports typically used for handover decisions.

Figure 13:
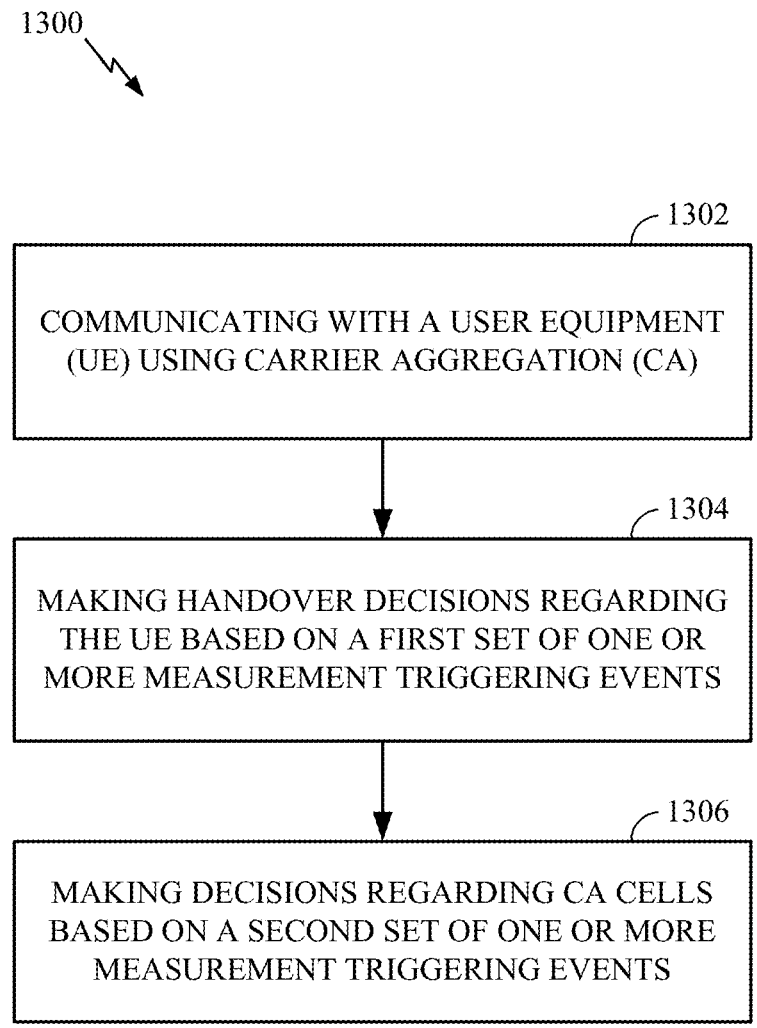
FIG. 13 illustrates example operations performed, for example, by a base station, according to aspects of the present disclosure.

FIG. 13 illustrates example operations 1300 that may be performed by a base station, such as eNodeB 510 shown in FIG. 5, in accordance with aspects of the present disclosure. The operations 1300 may be performed, for example, by one or more of Rx processor 570, controller/processor 575, or Tx processor 516.

The operations 1300 begin, at 1302, by communicating with a user equipment (UE) using carrier aggregation (CA). At 1302, the base station makes handover decisions regarding the UE based on a first set of one or more measurement triggering events (e.g., A3 and/or A5). At 1304, the base station makes decisions regarding CA cells based on a second set of one or more measurement triggering events (e.g., a combination of A1, A2, A4, and/or A6).

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
communicating, via at least a first receive chain and a second receive chain, with a first radio access technology (RAT) using carrier aggregation (CA);
tuning away, with the second receive chain, to communicate with a second RAT during a tune-away interval; and
manipulating reporting of measurement triggering events used for making decisions regarding CA cells for the first RAT based, at least in part, on a duration of the tune-away interval.

2. The method of claim 1, wherein communicating with the first RAT using CA comprises:
communicating via a primary component carrier (PCC) via the first receive chain; and
communicating via a secondary component carrier (SCC) via the second receive chain.

3. The method of claim 1, wherein the manipulating comprises:
manipulating measurements in a first manner for relatively short tune-away intervals less than or equal to a first duration; and
manipulating measurements in a second manner for relatively long tune-away intervals greater than the first duration.

4. The method of claim 3, wherein manipulating measurements in the first manner for relatively short tune-away intervals comprises:

sending a channel quality indicator (CQI) report with a low value regardless of actual corresponding measurements.

5. The method of claim 4, further comprising:
sending one or more reports based on actual corresponding measurements, after the tune-away interval.

6. The method of claim 1, wherein the manipulating comprises:
refraining from sending one or more measuring reports even if conditions for triggering such measurement reports are met.

7. The method of claim 1, wherein the manipulating comprises:
reporting a low value for one or more periodic measurement reports, regardless of actual corresponding measurements.

8. The method of claim 1, further comprising:
taking one or more actions to speed up resumption of CA operation after the tune-away interval.

9. The method of claim 8, wherein taking the one or more actions comprises transmitting a report on leave measurement report for a triggering event based on a condition that measurement for a cell is worse than a threshold value.

10. The method of claim 1, further comprising:
properly reporting measurement triggering events used for making handover decisions during the tune-away interval.

11. A method for wireless communications by a base station of a first radio access technology (RAT), comprising:
communicating with a user equipment (UE) using carrier aggregation (CA);
making handover decisions regarding the UE based on a first set of one or more measurement triggering events;
making decisions regarding CA cells based on a second set of one or more measurement triggering events; and
interpreting a report on leave measurement report for a triggering event related to a serving cell becoming worse than a threshold value as an indication that operation on a secondary component carrier should be resumed.

12. The method of claim 11, wherein the first set of one or more measurement triggering events comprises at least one of:
measurement of a neighbor cell becoming better than measurement of a serving cell by at least an offset amount; or
measurement of the serving cell becoming worse than a first threshold value and measurement of the neighbor cell becoming better than a second threshold value.

13. The method of claim 11, wherein the second set of one or more measurement triggering events comprises at least one of:
measurement of a serving cell becoming better than a first threshold value;
measurement of a serving cell becoming worse than a second threshold value;
measurement of a neighbor cell becoming better than a third threshold value; or
measurement of the neighbor cell becoming better than measurement of a secondary serving cell by at least a second offset value.

14. The method of claim 11, further comprising:
sending signaling to configure the UE with a set of threshold values to be used to trigger measurement events during tune-away intervals when the UE has tuned at least one receive chain from the first RAT.

15. An apparatus for wireless communications by a user equipment (UE), comprising:
means for communicating, via at least a first receive chain and a second receive chain, with a first radio access technology (RAT) using carrier aggregation (CA);
means for tuning away, with the second receive chain, to communicate with a second RAT during a tune-away interval; and
means for manipulating reporting of measurement triggering events used for making decisions regarding CA cells for the first RAT based, at least in part, on a duration of the tune-away interval.

16. The apparatus of claim 15, wherein the means for communicating with the first RAT using CA comprises:
means for communicating via a primary component carrier (PCC) via the first receive chain; and
means for communicating via a secondary component carrier (SCC) via the second receive chain.

17. The apparatus of claim 15, wherein the means for manipulating comprises:
means for manipulating measurements in a first manner for relatively short tune-away intervals less than or equal to a first duration; and
means for manipulating measurements in a second manner for relatively long tune-away intervals greater than the first duration.

18. The apparatus of claim 17, wherein the means for manipulating measurements in the first manner for relatively short tune-away intervals comprises:
means for sending a channel quality indicator (CQI) report with a low value regardless of actual corresponding measurements.

19. The apparatus of claim 18, further comprising:
means for sending one or more reports based on actual corresponding measurements, after the tune-away interval.

20. The apparatus of claim 15, wherein the means for manipulating comprises:
means for refraining from sending one or more measuring reports even if conditions for triggering such measurement reports are met.

21. The apparatus of claim 15, wherein the means for manipulating comprises:
means for reporting a low value for one or more periodic measurement reports, regardless of actual corresponding measurements.

22. The apparatus of claim 15, further comprising:
means for taking one or more actions to speed up resumption of CA operation after the tune-away interval.

23. The apparatus of claim 22, wherein the means for taking the one or more actions comprises means for transmitting a report on leave measurement report for a triggering event based on a condition that measurement for a cell is worse than a threshold value.

24. The apparatus of claim 15, further comprising:
means for properly reporting measurement triggering events used for making handover decisions during the tune-away interval.

25. An apparatus for wireless communications by a base station of a first radio access technology (RAT), comprising:
means for communicating with a user equipment (UE) using carrier aggregation (CA);
means for making handover decisions regarding the UE based on a first set of one or more measurement triggering events;

means for making decisions regarding CA cells based on a second set of one or more measurement triggering events; and means for interpreting a report on leave measurement report for a triggering event related to a serving cell becoming worse than a threshold value as an indication that operation on a secondary component carrier should be resumed.

26. The apparatus of claim 25, wherein the first set of one or more measurement triggering events comprises at least one of:
  measurement of a neighbor cell becoming better than measurement of a serving cell by at least an offset amount; or
  measurement of the serving cell becoming worse than a first threshold value and measurement of the neighbor cell becoming better than a second threshold value.

27. The apparatus of claim 25, wherein the second set of one or more measurement triggering events comprises at least one of:
  measurement of a serving cell becoming better than a first threshold value;
  measurement of a serving cell becoming worse than a second threshold value;
  measurement of a neighbor cell becoming better than a third threshold value; or
  measurement of the neighbor cell becoming better than measurement of a secondary serving cell by at least a second offset value.

28. The apparatus of claim 25, further comprising:
  means for sending signaling to configure the UE with a set of threshold values to be used to trigger measurement events during tune-away intervals when the UE has tuned at least one receive chain from the first RAT.

29. An apparatus for wireless communications by a user equipment (UE), comprising:
  at least one processor configured to communicate, via at least a first receive chain and a second receive chain, with a first radio access technology (RAT) using carrier aggregation (CA), tune away, with the second receive chain, to communicate with a second RAT during a tune-away interval, and manipulate reporting of measurement triggering events used for making decisions regarding CA cells for the first RAT based, at least in part, on a duration of the tune-away interval; and
  a memory coupled with the at least one processor.

30. An apparatus for wireless communications by a base station of a first radio access technology (RAT), comprising:
  at least one processor configured to communicate with a user equipment (UE) using carrier aggregation (CA), make handover decisions regarding the UE based on a first set of one or more measurement triggering events, make decisions regarding CA cells based on a second set of one or more measurement triggering events and interpret a report on leave measurement report for a triggering event related to a serving cell becoming worse than a threshold value as an indication that operation on a secondary component carrier should be resumed; and
  a memory coupled with the at least one processor.

31. A program product for wireless communications by a user equipment (UE), comprising a non-transitory computer readable medium having instructions stored thereon for:
  communicating, via at least a first receive chain and a second receive chain, with a first radio access technology (RAT) using carrier aggregation (CA);
  tuning away, with the second receive chain, to communicate with a second RAT during a tune-away interval; and
  manipulating reporting of measurement triggering events used for making decisions regarding CA cells for the first RAT based, at least in part, on a duration of the tune-away interval.

32. A program product for wireless communications by a base station of a first radio access technology (RAT), comprising a non-transitory computer readable medium having instructions stored thereon for:
  communicating with a user equipment (UE) using carrier aggregation (CA);
  making handover decisions regarding the UE based on a first set of one or more measurement triggering events;
  making decisions regarding CA cells based on a second set of one or more measurement triggering events; and
  interpreting a report on leave measurement report for a triggering event related to a serving cell becoming worse than a threshold value as an indication that operation on a secondary component carrier should be resumed.

* * * * *